United States Patent
Barrass

(10) Patent No.: US 7,835,381 B1
(45) Date of Patent: Nov. 16, 2010

(54) PROVIDING POINT TO MULTI-POINT COMMUNICATION FOR DIGITAL SUBSCRIBER LOOPS

(75) Inventor: Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1439 days.

(21) Appl. No.: 10/755,177

(22) Filed: Jan. 9, 2004

(51) Int. Cl.
*H04J 3/26* (2006.01)
(52) U.S. Cl. ...................................... 370/432
(58) Field of Classification Search ................ 375/222, 375/144; 370/254
See application file for complete search history.

(56) References Cited

U.S. PATENT DOCUMENTS

| | | | |
|---|---|---|---|
| 6,011,781 A | 1/2000 | Bell ............................ | 370/254 |
| 6,038,251 A * | 3/2000 | Chen ........................... | 375/222 |
| 6,304,578 B1 * | 10/2001 | Fluss .......................... | 370/413 |
| 6,707,822 B1 * | 3/2004 | Fadavi-Ardekani et al. ...... | 370/395.5 |
| 2002/0030865 A1 * | 3/2002 | Kawate et al. ............... | 359/110 |
| 2002/0118643 A1 * | 8/2002 | Shalvi et al. ................. | 370/230 |
| 2002/0159120 A1 * | 10/2002 | Kitayama et al. ............ | 359/168 |
| 2003/0117998 A1 * | 6/2003 | Sala et al. ................... | 370/351 |
| 2003/0137975 A1 * | 7/2003 | Song et al. .................. | 370/353 |
| 2004/0109688 A1 * | 6/2004 | Kim et al. ...................... | 398/68 |
| 2004/0146301 A1 * | 7/2004 | Choi et al. ..................... | 398/58 |
| 2005/0114879 A1 * | 5/2005 | Kamieniecki ................. | 725/15 |

OTHER PUBLICATIONS

"Ethernet Passive Optical Networks Tutorial", Web ProForum Tutorial: Ethernet Passive Optical Networks, http://www.onforum.com/tutorials/epon/topic05.html, 4 pages, Apr. 10, 2001.
"61. Physical Coding Sublayer (PCS) and common specifications, type 10PASS-TS and type 2BASE-TL", Amendment to IEEE Std 802.3-2002™, Ethernet in the First Mile, IEEE *Draft* P802.3ah™/D1.9, Copyright 2003, IEEE, pp. 319-434, Jul. 10, 2003.
"64. Multi-Point MAC Control", Amendment to IEEE Std 802.3-2002™, Ethernet in the First Mile, IEEE *Draft* P802.3ah™/D1.9, Copyright 2003, IEEE, pp. 435-516, Jul. 10, 2003.

* cited by examiner

*Primary Examiner*—Chirag G Shah
*Assistant Examiner*—Otis L Thompson, Jr.
(74) *Attorney, Agent, or Firm*—Baker Botts L.L.P.

(57) ABSTRACT

Providing point to multi-point communication includes associating channels to endpoint nodes of a digital subscriber line, where each channel is associated with an endpoint node, and associating channel criteria to the endpoint nodes, where each channel criterion is associated with an endpoint node. Downstream packets are broadcast from a headend node to the endpoint nodes using the channels. Upstream packets transmitted from the endpoint nodes are received, where the upstream packets are multiplexed according to the channel criteria.

20 Claims, 2 Drawing Sheets

PROVIDING POINT TO MULTI-POINT COMMUNICATION FOR DIGITAL SUBSCRIBER LOOPS

TECHNICAL FIELD OF THE INVENTION

This invention relates generally to the field of telecommunications and more specifically to providing point to multi-point communication for digital subscriber loops.

BACKGROUND OF THE INVENTION

A headend node located at a central office or other digital subscriber loop service provider may provide communication services to one or more endpoint nodes such as terminal devices located at a customer premises. In certain situations, a customer may desire multiple services. According to a known technique, providing services to a customer may involve using a direct connection from the service provider to the terminal device. This technique, however, is not practical if more than one service delivery point is needed. According to another known technique, the service provider may provide services to multiple terminal devices using a point to multi-point link through a subscriber gateway device. The subscriber gateway device directs the signals to the appropriate endpoint node. The service provider, however, typically cannot control delivery of the service from the subscriber gateway device to the endpoint node. Accordingly, known techniques for providing point to multi-point communication for digital subscriber loops may be unsatisfactory in certain conditions.

SUMMARY OF THE INVENTION

In accordance with the present invention, disadvantages and problems associated with previous techniques for providing point to multi-point communication may be reduced or eliminated.

According to one embodiment of the present invention, providing point to multi-point communication includes associating channels to endpoint nodes of a digital subscriber line, where each channel is associated with an endpoint node, and associating channel criteria to the endpoint nodes, where each channel criterion is associated with an endpoint node. Downstream packets are broadcast from a headend node to the endpoint nodes using the channels. Upstream packets transmitted from the endpoint nodes are received, where the upstream packets are multiplexed according to the channel criteria.

Certain embodiments of the invention may provide one or more technical advantages. A technical advantage of one embodiment may be that a service provider may provide multiple services to a customer without requiring a subscriber gateway device. Accordingly, the service provider may be able to substantially completely control delivery of the service to the endpoint node.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
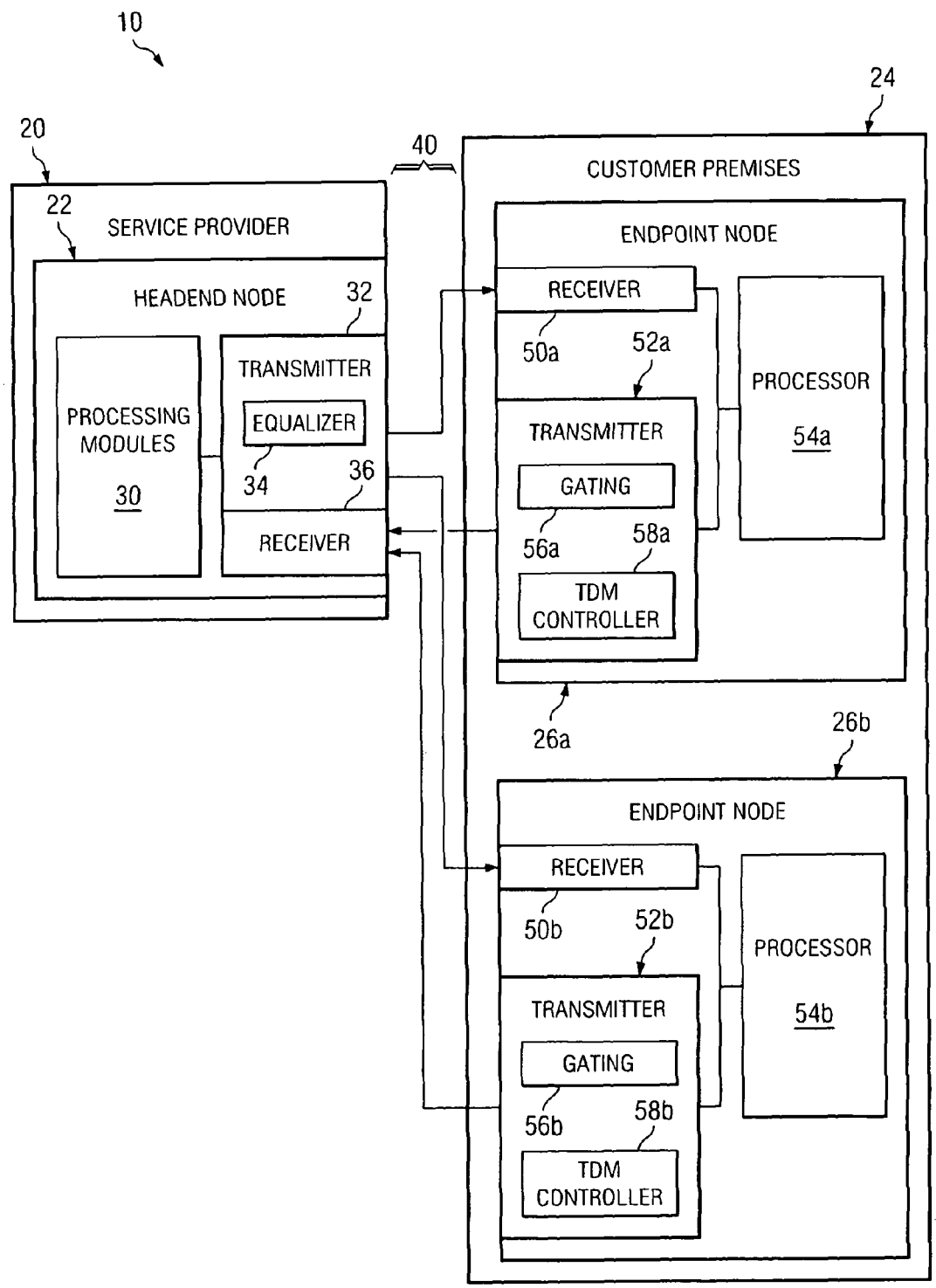
FIG. 1 is a block diagram illustrating one embodiment of a system for providing point to multi-point communication.
Figure 2:
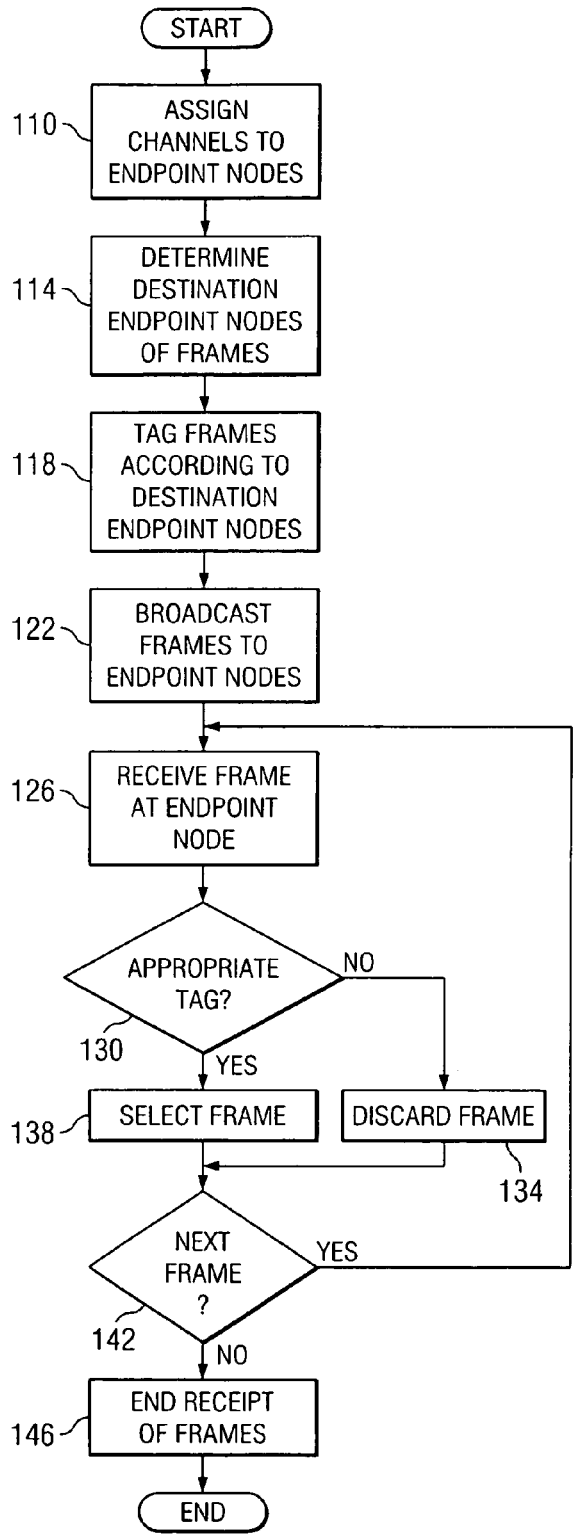
FIG. 2 is a flowchart illustrating one embodiment of a method for communicating downstream packets from a headend node to endpoint nodes.
Figure 3:
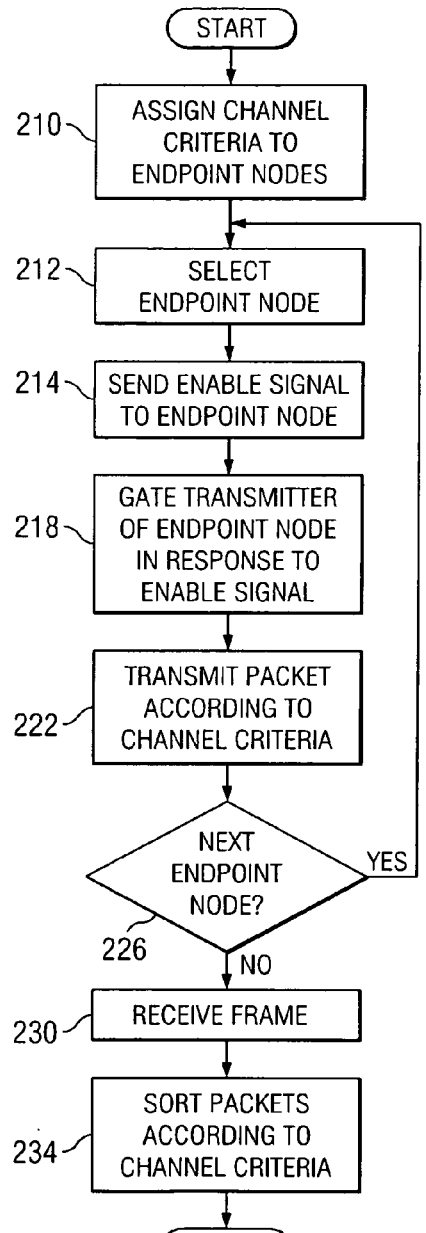
FIG. 3 is a flowchart illustrating one embodiment of a method for transmitting upstream packets from endpoint nodes to a headend node.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 for providing point to multi-point communication. According to the embodiment, system 10 may provide point to multi-point communication using a digital subscriber line (DSL) physical layer with a media access controller (MAC) such as an Ethernet media access controller. System 10 may reduce or eliminate the need for a subscriber gateway device at a customer premises.

According to one embodiment, system 10 may be included in a communication network that allows communication devices to communicate with each other. A communication network may comprise a digital subscriber loop, which may be used to communicate with a public switched telephone network (PSTN), a public or private data network, the Internet, a wireline or wireless network, a local, regional, or global communication network, an enterprise intranet, other suitable communication link, or any combination of the preceding. Devices of the communication network may be coupled to each other using a local area network (LAN), a metropolitan area network (MAN), a wide area network (WAN), a global computer network such as the Internet, or any other appropriate wire line, wireless, or other link.

According to the illustrated embodiment, system 10 includes a service provider 20, links 40, and customer premises 24 coupled as shown in FIG. 1. According to one embodiment of operation, service provider 20 may include a headend node 22 that broadcasts, multicasts, unicasts, or any combination of the preceding, downstream packets comprising frames to one or more endpoint nodes 26*a-b* of customer premises 24 according to the Ethernet protocol. Headend node 22 may tag each frame to identify the destination endpoint node 26*a-b* of the frame. The frames may be intended for some or all endpoint nodes 26*a-b*. An endpoint node 26*a-b* accepts the frames that are intended for the endpoint node 26*a-b*, and discards frames that are intended for other endpoint nodes 26*a-b*. Endpoint nodes 26*a-b* send upstream signals to headend node 22 according to a time division multiple access (TDMA) or a frequency domain sharing process.

According to one embodiment, service provider 20 may comprise any entity operable to provide services to a customer, for example, a central office such as a Class 5 end office. Headend node 22 may comprise any node suitable for providing point to multi-point communication for digital subscriber loops. Headend node 22 may communicate packets according to any suitable multi-point media access control function such as a modified version of the media access control function defined by Clauses 64 and 65 of IEEE 802.3ah standard. The media access control specification for Ethernet may be modified to support a slower bit rate of a digital subscriber line. Small split ratios may be required to support premium services.

According to the illustrated embodiment, headend node 22 may comprise one or more processing modules 30, a transmitter 32 having an equalizer 34, and a receiver 36 coupled as shown in FIG. 1. Processing modules 30 perform management and processing operations to communicate data packets between headend node 22 and endpoint nodes 26a-b. A packet comprises a bundle of data organized in a specific way for transmission. A frame comprises a packet along with the appropriate preamble, postamble, and delimiting characters. A packet may carry any suitable data such as voice, data information, multimedia, other information, or any combination of the preceding.

Processing modules 30 may allocate channels to endpoint nodes 26a-b. The direction from transmitter 32 to any, some, or all of receivers 50a-b is defined as the downstream direction. The direction from any, some, or all of transmitters 52a-b to receiver 36 is defined as the upstream direction. There may be no communication path from any transmitter 52a-b to any receiver 50a-b. A channel comprises a virtual path along which packets may be communicated.

Channels may be allocated in any suitable manner. According to one embodiment, processing modules 30 may allocate a channel to broadcast downstream packets to endpoint nodes 26a-b, and one or more channels may be allocated to unicast upstream packets from each endpoint node 26a-b. According to the embodiment, a channel criterion such as a time slot or frequency may be assigned to each endpoint node 26a-b in order to transmit packets. For example, a channel criterion such as a time slot may be assigned to each endpoint node 26a-b in order to transmit packets according to the time division multiple access (TDMA) process. Other suitable channel criteria, however, may be used. The upstream and downstream signals may be separated by frequency division duplexing.

Processing modules 30 may process packets for broadcast to endpoint nodes 26a-b. According to one embodiment, packets may be encapsulated into frames for transmission between headend node 22 and endpoint nodes 26a-b. Each frame may include an endpoint identifier that identifies the destination endpoint node 26a-b of the frame.

Clocking information to synchronize headend node 22 with endpoint nodes 26a-b may be included at the beginning of each frame. Clocking information may be in the form of a synchronization marker, which comprises a one-byte code transmitted every two milliseconds to synchronize headend node 22 with customer premises 24. According to one embodiment, the preamble of the Ethernet frame may remain on the frame as it is transmitted over link 40. For one embodiment, receiver 36 may store the timing state corresponding to each endpoint node 26a-b, which may improve the efficiency of time domain multiplexing of upstream data. Clocks for endpoint nodes 26a-b may be derived from the patterns of the downstream data and may, therefore, be isochronous with headend node 22.

Transmitter 32 communicates downstream packets to endpoint nodes 26a-b over links 40. The packets may be transmitted at any suitable speed, such as approximately ten megabits per second. In one embodiment, equalizer 34 may save a configuration state, such as the state of an equalization function, for each endpoint node 26a-b in order to avoid reconfiguration for each new communication with a different endpoint node 26a-b for a TDMA implementation. A configuration state may comprise values for parameters of a function according to which equalizer 34 operates. Equalizer 34 may access the saved state for an endpoint node 26a-b in order to quickly adapt to the endpoint node 26a-b. Receiver 36 receives upstream packets from endpoint nodes 26a-b.

A link 40 couples headend node 22 and endpoint nodes 26a-b. Link 40 may comprise any suitable communication media operable to provide a communication line such as a digital subscriber line and to allow for one or more channels. According to one embodiment, link 40 may comprise a twisted pair of copper wires.

Customer premises 24 may comprise any suitable location where one or more endpoint nodes 26a-b may be located. For example, customer premises 24 may comprise a residence, a business, or other suitable location. An endpoint node 26a-b may comprise any suitable terminal device, or customer premises equipment, such as a telephone, a key system, a private branch exchange (PBX), a modem, a video conferencing device, or other suitable communication equipment connected to a telephone network. According to the illustrated embodiment, customer premises 24 includes two endpoint nodes 26a-b. Customer premises 24, however, may include any suitable number of endpoint nodes 26a-b, or any suitable number of endpoint nodes 26a-b may be located at any suitable number of premises 24.

An endpoint node 26a-b may comprise a physical device conforming to the physical layer specification as defined by Clauses 61, 62, and 63 of IEEE 802.3ah. Clauses 61, 62, and 63 define the physical coding sublayer (PCS), the physical medium attachment (PMA), and the physical medium dependent (PMD) layers for Ethernet over a digital subscriber line.

Endpoint nodes 26a-b may include a receiver 50a-b, a transmitter 52a-b, and a processor 54a-b coupled as shown in FIG. 1. Receiver 30a receives signals from headend node 22 and sends the signals to processor 54. Processor 34 may filter and amplify received signals, prepare outgoing signals for output, and perform other suitable processing of the received signals. Processor 34a-b may comprise any device operable to accept input, process the input according to predetermined rules, and produce an output.

Transmitter 52a-b communicates upstream signals to headend node 22. Transmitter 52a-b may include a gating device 56a-b and a time division multiplex (TDM) controller 58a-b. Gating device 56a-b turns transmitter 52a-b on and off. Gating device 56a-b may gate transmitter 52a-b according to a control signal such as an enable signal received from headend node 22.

Time division multiplex (TDM) controller 58a-b controls the timing of the upstream transmission of frames. A frame may be segmented into endpoint node-specific time slots. A packet from an endpoint node 26a-b may be placed in a time slot designated for the endpoint node 26a-b. According to one embodiment, the time slots are synchronized so that upstream packets from the endpoint nodes 26a-b do not interfere with each other once the data arrives at a common link. For example, endpoint node 26a transmits a first packet or set of packets in a first time slot, and endpoint node 26b transmits a second packet or set of packets in a second non-overlapping time slot. According to one embodiment, time division multiplex controller 58a-b may initiate transmission of a packet in response to receiving a window grant from headend node 22.

According to one embodiment of operation, headend node 22 tags each frame to identify the destination endpoint node 26a-b of the frame, and broadcasts the frames to the endpoint nodes 26a-b. An endpoint node 26a-b accepts the frames that are intended for the endpoint node 26a-b, and discards frames that are intended for other endpoint nodes 26a-b. Endpoint nodes 26a-b send upstream signals to headend node 22 according to a time division multiple access procedure. For example, an endpoint node providing a high bandwidth service may be allocated a longer time slot than other endpoint nodes. An endpoint node providing a low latency service may be allocated time slots more frequently than other endpoint nodes.

Modifications, additions, or omissions may be made to system 10 without departing from the scope of the invention. For example, system 10 may have more, fewer, or other modules. Moreover, the operations of system 10 may be performed by more, fewer, or other modules. For example, the operations of transmitter 32 and equalizer 34 may be performed by one module, or the operations of a processing module 30 may be performed by more than one module. Additionally, functions may be performed using any suitable logic comprising software, hardware, other logic, or any suitable combination of the preceding. As used in this document, "each" refers to each member of a set or each member of a subset of a set.

According to an alternative embodiment, upstream channels may be allocated according to a discreet multi-tone (DMT) procedure, where a channel criterion corresponds to a tone or set of tones. Processing modules 30 may allocate tones or frequency bands for broadcasting downstream packets to endpoint nodes 26*a-b*, and may allocate a tone or set of tones to each endpoint node 26*a-b* to unicast upstream packets to headend node 22. According to one embodiment, the number and quality of tones allocated to each upstream channel may be varied according to the service requirements for the corresponding node 26*a-b*. For example, an endpoint node providing a high bandwidth service may be allocated more tones or tones supporting a higher data rate, whereas an endpoint node providing a high reliability service may be allocated tones at lower frequencies, which are normally less prone to interference.

The allocation of channels may take into account the quality of the physical communication channel between the headend node 22 and each particular endpoint node 26*a-b*. For example, in one embodiment, the physical connection to one endpoint node may not support as high a rate of data transmission as supported for other endpoint nodes. In this case, a longer timeslot may be allocated for communication to that endpoint node to compensate for the lower data rate. In another embodiment, the physical connection to one endpoint node may not support as many bits per tone as supported for other endpoint nodes. In this case, more tones may be allocated to that endpoint node to compensate for the lower number of bits per tone. Other factors may be taken into account in the allocation of channels to endpoint nodes. In one embodiment, timeslots may be allocated to endpoint nodes using a round-robin procedure. In another embodiment, tones may be allocated to endpoint nodes using an iterative water-filling procedure. The allocation of channels may also be weighted according to the service requirements of each endpoint node.

System 10 may provide certain advantages over known techniques. According to a known technique, a direct connection may be made between the service provider and the endpoint nodes. This approach, however, is not practical if multiple services or multiple service delivery points are desired at customer premises 24. According to another known technique, service provider 20 may go through a subscriber gateway device to provide multiple services. Managing communication from a subscriber gateway device to endpoint nodes 26*a-b*, however, may be difficult for service provider 20. Service provider 20 may be required to restrict the network option between the subscriber gateway device and endpoint nodes 26*a-b*, and may be expected to manage and debug problems occurring between the subscriber gateway device and endpoint nodes 26*a-b*. System 10 may provide advantages over known techniques by providing point to multipoint communication from service provider 20 to customer premises 24 without the need for a subscriber gateway device.

FIG. 2 is a flowchart illustrating one embodiment of a method for communicating downstream packets from headend node 22 to endpoint nodes 26*a-b*. The method begins at step 110, where headend node 22 assigns a downstream channel to broadcast packets to endpoint nodes 26*a-b*. Destination endpoint nodes 26*a-b* of downstream frames are determined at step 114. The destination endpoint node 26*a-b* of a frame may refer to the destination of a frame, and may be determined from a destination address of the frame.

Headend node 22 tags the frames to identify the destination endpoint nodes 26*a-b* of the frames at step 118. The frames may be tagged by adding an endpoint node identifier to the preamble of the frame. Headend node 22 broadcasts the frames to endpoint nodes 26*a-b* across links 40 at step 122.

An endpoint node 26*a* receives a downstream frame at step 126. Endpoint node 26*a* determines whether the frame has the appropriate tag at step 130. According to this example, an appropriate tag indicates that endpoint node 26*a* is the destination for the frame. If the frame does not have the appropriate tag at step 130, the method proceeds to step 134, where endpoint node 26*a* discards the frame. If the frame has an appropriate tag at step 130, the method proceeds to step 138, where endpoint node 26*a* selects the frame. The method then proceeds to step 142.

If there is a next frame a step 142, the method returns to step 126, where the next frame is received at endpoint node 26*a*. If there is no next frame at step 142, the method proceeds to step 146. The receipt of frames is ended at step 146. After ending the receipt of frames, the method terminates.

Modifications, additions, or omissions may be made to the method without departing from the scope of the invention. Additionally, steps may be performed in any suitable order without departing from the scope of the invention. In one embodiment, the detailed mechanism for steps 114, 118, and 130 may follow the definitions of IEEE 802.3 Clauses 64 and 65.

FIG. 3 is a flowchart illustrating one embodiment of a method for transmitting upstream packets from endpoint nodes 26*a-b* to headend node 22. The method begins at step 210, where headend node 22 assigns a channel criterion to each endpoint node 26*a-b*. A channel criterion may comprise, for example, a tone or a time slot. An endpoint node 26*a* is selected to transmit a packet at step 212. Headend node 22 sends an enable signal to the selected endpoint node 26*a* at step 214. Gating device 56*a* gates transmitter 52*a* of endpoint node 26*a* on response to receiving the enable signal at step 218. Transmitter 52*a* transmits the packet according to the assigned channel criteria at step 222. After transmission, gating device 56*a* gates transmits 52*a* off.

There may be a next endpoint node 26*b* at step 226.

If there is a next endpoint node 26*b*, the method returns to step 212, where the next endpoint node 26*b* is selected. If there is no next endpoint node 26*b* at step 226, the method proceeds to step 230, where the frame is received at headend node 22. Processing modules 30 sort the packets according to the channel criteria at step 234. After sorting the packets of the frame, the method terminates.

Modifications, additions, or omissions may be made to the method without departing from the scope of the invention. For example, if a discreet multi-tone (DMT) procedure is used, the sending of an enable signal at step 214 and the gating of transmitter 52a at step 218 may be replaced by a tone allocation message. Additionally, steps may be performed in any suitable order without departing from the scope of the invention. In one embodiment, the detailed mechanism for steps 212, 214, 218, 226, and 234 may follow the definitions of IEEE 802.3 Clauses 64 and 65.

Although an embodiment of the invention and its advantages are described in detail, a person skilled in the art could make various alterations, additions, and omissions without departing from the spirit and scope of the present invention as defined by the appended claims.

What is claimed is:

1. A method for providing point to multi-point communication, comprising:
    associating a plurality of channels to a plurality of endpoint nodes of a digital subscriber line, each channel associated with an endpoint node;
    associating a plurality of channel criteria to the plurality of endpoint nodes, each channel criterion associated with an endpoint node;
    weighting an allocation of channels to the plurality of endpoint nodes according to the service requirements of each endpoint node;
    broadcasting, independently of a subscriber gateway, a plurality of downstream Ethernet packets from a headend node to the plurality of endpoint nodes using the plurality of channels, each packet having an endpoint identifier, each endpoint node configured to: accept a downstream packet if the endpoint identifier of the downstream packet corresponds to the endpoint node; and discard the downstream packet if the endpoint identifier does not correspond to the endpoint node;
    sending an enable signal to the endpoint nodes;
    receiving an upstream Ethernet packet from each endpoint node communicated by a transmitter gate gated in response to the enable signal;
    multiplexing the upstream packets according to the channel criteria;
    saving a configuration state corresponding to a first endpoint node of the plurality of endpoint nodes;
    saving a state of an equalizer function corresponding to the first endpoint node; and
    communicating with the first endpoint node according to the configuration state and the state of the equalizer function.

2. The method of claim 1, wherein broadcasting the plurality of downstream packets from the headend node to the plurality of endpoint nodes using the plurality of channels further comprises broadcasting the plurality of downstream packets according to a media access control associated with the Ethernet protocol.

3. The method of claim 1, wherein associating a plurality of channels to a plurality of endpoint nodes of a digital subscriber line, each channel associated with an endpoint node, further comprises:
    polling each endpoint node of the plurality of endpoint nodes;
    determining a reception quality associated with each endpoint node; and
    allocating the channels according to the determination.

4. The method of claim 1, further comprising associating a plurality of upstream channels with the plurality of endpoint nodes according to a discreet multi-tone (DMT) procedure by allocating the one or more tones to each endpoint node.

5. The method of claim 1, wherein the plurality of endpoint nodes comprise a plurality of digital subscriber line devices.

6. The method of claim 1, wherein transmitting the plurality of upstream packets from the plurality of endpoint nodes further comprises:
    turning on a transmitter of the endpoint node;
    transmitting a portion of the plurality of upstream packets; and
    turning off the transmitter of the endpoint node.

7. A system for providing point to multi-point communication, comprising:
    a plurality of processing modules operable to:
        associate a plurality of channels to a plurality of endpoint nodes of a digital subscriber line, each channel associated with an endpoint node;
        weight an allocation of channels to the plurality of endpoint nodes according to the service requirements of each endpoint node;
        associate a plurality of channel criteria to the plurality of endpoint nodes, each channel criterion associated with an endpoint node; and
    a transmitter coupled to the processing modules and operable to broadcast, independently of a subscriber gateway, a plurality of downstream Ethernet packets from a headend node to the plurality of endpoint nodes using the plurality of channels, each packet having an endpoint identifier, each endpoint node configured to accept a downstream packet if the endpoint identifier corresponds to the endpoint node and discard the downstream packet if the endpoint identifier does not correspond to the endpoint node;
    the transmitter further operable to send an enable signal to the endpoint nodes; and
    the processing modules further operable to:
        receive an upstream Ethernet packet from each endpoint node communicated by a transmitter gate gated in response to the enable signal, the upstream packets from the endpoints multiplexed according to the channel criteria;
        save a configuration state corresponding to a first endpoint node of the plurality of endpoint nodes;
        save a state of an equalizer function corresponding to the first endpoint node; and
        communicate with the first endpoint node according to the configuration state and the state of the equalizer function.

8. The system of claim 7, wherein the processing modules are further operable to broadcast the plurality of downstream packets according to a media access control associated with the Ethernet protocol.

9. The system of claim 7, wherein the processing modules are further operable to:
    poll each endpoint node of the plurality of endpoint nodes;
    determine a reception quality associated with each endpoint node; and
    allocate the channels according to the determination.

10. The system of claim 7, wherein the processing modules are further operable to associate a plurality of upstream channels with the plurality of endpoint nodes according to a discreet multi-tone (DMT) procedure by allocating the one or more tones to each endpoint node.

11. The system of claim 7, wherein the plurality of endpoint nodes comprise a plurality of digital subscriber line devices.

12. The system of claim 7, wherein the transmitter is operable to transmit the plurality of upstream packets from the plurality of endpoint nodes by:
    turning on;

transmitting a portion of the plurality of upstream packets; and turning off.

13. A non-transitory computer-readable medium storing software for providing point to multi-point communication, the software executable by a computer and operable to:

associate a plurality of channels to a plurality of endpoint nodes of a digital subscriber line, each channel associated with an endpoint node;

weight an allocation of channels to the plurality of endpoint nodes according to the service requirements of each endpoint node;

associate a plurality of channel criteria to the plurality of endpoint nodes, each channel criterion associated with an endpoint node;

broadcast, independently of a subscriber gateway, a plurality of downstream Ethernet packets from a headend node to the plurality of endpoint nodes using the plurality of channels, each packet having an endpoint identifier, each endpoint node configured to accept a downstream packet if the endpoint identifier corresponds to the endpoint node and discard the downstream packet if the endpoint identifier does not correspond to the endpoint node;

send an enable signal to the endpoint nodes;

receive an upstream Ethernet packet to the headend node from each endpoint node communicated by a transmitter gate gated in response to the enable signal;

multiplex the upstream packets according to the channel criteria;

save a configuration state corresponding to a first endpoint node of the plurality of endpoint nodes;

save a state of an equalizer function corresponding to the first endpoint node; and communicate with the first endpoint node according to the configuration state and the state of the equalizer function.

14. The non-transitory computer-readable medium of claim 13, the software operable to broadcast the plurality of downstream packets from the headend node to the plurality of endpoint nodes using the plurality of channels by broadcasting the plurality of downstream packets according to a media access control associated with the Ethernet protocol.

15. The non-transitory computer-readable medium of claim 13, the software operable to associate a plurality of channels to a plurality of endpoint nodes of a digital subscriber line, each channel associated with an endpoint node, by:

polling each endpoint node of the plurality of endpoint nodes;

determining a reception quality associated with each endpoint node; and allocating the channels according to the determination.

16. The non-transitory computer-readable medium of claim 13, the software operable to associate a plurality of upstream channels with the plurality of endpoint nodes according to a discreet multi-tone (DMT) procedure by allocating the one or more tones to each endpoint node.

17. The non-transitory computer-readable medium of claim 13, wherein the plurality of endpoint nodes comprise a plurality of digital subscriber line devices.

18. The non-transitory computer-readable medium of claim 13, the software operable to transmit the plurality of upstream packets from the plurality of endpoint nodes by:

turning on a transmitter of the endpoint node;

transmitting a portion of the plurality of upstream packets; and turning off the transmitter of the endpoint node.

19. A system for providing point to multi-point communication, comprising:

means for associating a plurality of channels to a plurality of endpoint nodes of a digital subscriber line, each channel associated with an endpoint node;

means for weighting an allocation of channels to the plurality of endpoint nodes according to the service requirements of each endpoint node;

means for associating a plurality of channel criteria to the plurality of endpoint nodes, each channel criterion associated with an endpoint node;

means for broadcasting, independently of a subscriber gateway, a plurality of downstream Ethernet packets from a headend node to the plurality of endpoint nodes using the plurality of channels, each packet having an endpoint identifier, each endpoint node configured to accept a downstream packet if the endpoint identifier of the downstream packet corresponds to the endpoint node and discard the downstream packet if the endpoint identifier does not correspond to the endpoint node;

means for sending an enable signal to the endpoint nodes;

means for receiving an upstream Ethernet packet from each endpoint node communicated by a transmitter gate gated in response to the enable signal; and means for multiplexing the upstream packets according to the channel criteria;

means for saving a configuration state corresponding to a first endpoint node of the plurality of endpoint nodes;

means for saving a state of an equalizer function corresponding to the first endpoint node; and means for communicating with the first endpoint node according to the configuration state and the state of the equalizer function.

20. A method for providing point to multi-point communication, comprising:

associating a plurality of channels to a plurality of endpoint nodes of a digital subscriber line, each channel associated with an endpoint node, by polling each endpoint node of the plurality of endpoint nodes, by determining a reception quality associated with each endpoint node, and by allocating the channels according to the determination;

associating a plurality of channel criteria to the plurality of endpoint nodes, each channel criterion associated with an endpoint node;

weighting the allocation of channels to the plurality of endpoint nodes according to the service requirements of each endpoint node;

broadcasting, independently of a subscriber gateway, a plurality of downstream Ethernet packets from a headend node to the plurality of endpoint nodes using the plurality of channels according to a media access control associated with the Ethernet protocol;

receiving at the plurality of endpoint nodes the plurality of downstream packets communicated from the headend node using the plurality of channels, the plurality of endpoint nodes comprising a plurality of digital subscriber line devices;

repeating the following for each endpoint node of the plurality of endpoint nodes:

determining an endpoint identifier of a downstream packet of the plurality of downstream packets;

accepting the downstream packet if the endpoint identifier corresponds to the endpoint of the plurality of endpoint nodes; and discarding the downstream packet if the endpoint identifier does not correspond to the endpoint of the plurality of endpoint nodes;

sending an enable signal to the endpoint nodes;

receiving an upstream Ethernet packet from each endpoint node communicated by a transmitter gate gated in response to the enable signal;

multiplexing the upstream packets according to the plurality of channel criteria, the plurality of upstream packets transmitted from the plurality of endpoint nodes by turning on a transmitter of the endpoint node, by transmitting a portion of the plurality of upstream packets, and by turning off the transmitter of the endpoint node;

saving a configuration state corresponding to an endpoint node of the plurality of endpoint nodes, and communicating with the endpoint node according to the state of the configuration state; and saving a state of an equalizer function corresponding to an endpoint node of the plurality of endpoint nodes, and communicating with the endpoint node according to the state of the equalizer function.

\* \* \* \* \*